US012059390B2

(12) United States Patent
Deokinandan

(10) Patent No.: US 12,059,390 B2
(45) Date of Patent: Aug. 13, 2024

(54) NASOGASTRIC TUBE STABILIZATION SYSTEM

(71) Applicant: Mira Deokinandan, Jamaica, NY (US)

(72) Inventor: Mira Deokinandan, Jamaica, NY (US)

( * ) Notice: Subject to any disclaimer, the term of this patent is extended or adjusted under 35 U.S.C. 154(b) by 130 days.

(21) Appl. No.: 16/949,192

(22) Filed: Oct. 19, 2020

(65) Prior Publication Data

US 2022/0117853 A1 Apr. 21, 2022

(51) Int. Cl.
*A61J 15/00* (2006.01)

(52) U.S. Cl.
CPC ....... *A61J 15/0061* (2013.01); *A61J 15/0003* (2013.01)

(58) Field of Classification Search
CPC .. A61J 15/0061; A61J 15/0003; A61M 25/02; A61M 16/0683; A61M 16/0688; A61M 2025/0213; A61M 2025/022; A61M 2025/0226; A61M 2025/024; A61M 2025/0253; A61M 2025/026; A61M 2025/0266
See application file for complete search history.

(56) References Cited

U.S. PATENT DOCUMENTS 4,520,813 A * 6/1985 Young .................. A61M 25/02 24/DIG. 42
4,932,943 A * 6/1990 Nowak ................ A61M 25/02 604/178
5,383,451 A * 1/1995 Delulio ............ A61M 16/0488 128/DIG. 26
5,833,663 A * 11/1998 Bierman .............. A61M 25/02 604/174

* cited by examiner

*Primary Examiner* — Chelsea E Stinson
*Assistant Examiner* — Phoebe Anne Staton
(74) *Attorney, Agent, or Firm* — Dunlap Bennett & Ludwig, PLLC

(57) ABSTRACT

A nasogastric tube stabilization system is provided. The nasogastric tube stabilization clip includes a clip operatively associated between the first portion and the second portion of nasogastric tube stabilization adhesive, wherein the clip is movable between a clipped condition and an unclipped condition, enabling the first and second portions of nasogastric tube stabilization adhesive to move independently of each other for facilitating treatment of a patient, wherein the nasogastric tube stabilization adhesive portions adhere to a nasogastric tube and the nose of patient, respectively, thereby in the clipped condition the nasogastric tube stabilization system stabilizes the nasogastric tube relative to the patient.

7 Claims, 4 Drawing Sheets

NASOGASTRIC TUBE STABILIZATION SYSTEM

BACKGROUND OF THE INVENTION

The present invention relates to medical devices and, more particularly, a nasogastric tube stabilization system movable between a clipped condition and an unclipped condition, wherein the clipped condition interconnects two separate pieces of adhesive that stabilize a nasogastric tube to the nose of a patient, while the unclipped condition facilitates a caregiver's access to and assessment of the patient.

Nasogastric intubation is a medical process involving the insertion of a plastic tube (the nasogastric tube) through the nose, past the throat and down into the stomach so that the stomach can be supplied via the nose by way of the nasogastric tube. Nasogastric tubes required for feeding or gastric decompression can remain in place for weeks to months and can cause discomfort and mucosal irritation to the patient, and so have to be both stabilized and routinely checked by medical personnel or caregivers.

Current nasogastric tube stabilization techniques, to prevent the nasogastric tube's dislodgement from the nose of hospitalized patients, involve the use of an adhesive that is very sticky and difficult to remove. The experience is quite unpleasant for the patient as the caregiver manipulates scissors close to their face to remove the adhesive from the tube. The discomfort also causes the patient to pull away from the caregiver, risking dislodging the tube. The whole process also causes irritation to the mucus membrane and can even cause the patient to sneeze, and it is quite hard to blow one's intubated nose.

Furthermore, nasogastric tubes that are insufficiently maintained or replaced pose the following risks to the user's health. Pressure ulcers within the nasal mucosa can occur fast as it is a moist and sensitive area. The nose has very little soft tissue, right below the skin is cartilage. Once the skin deteriorates from pressure and moisture you reach nasal cartilage. The damage caused by nasogastric tubes can leave permanent deformity if the tube sits directly on the nare for too long as cartilage cannot regenerate and heal back to its prior form.

As can be seen, there is a need for a nasogastric tube stabilization clip that removably interconnects two portions of the nasogastric tube stabilization adhesive, facilitating both stabilization of the nasogastric tube and assessment and maintenance of the patient.

The nasogastric tube stabilization clip is movable between a clipped condition and an unclipped condition—wherein the clipped condition interconnects two separate pieces of adhesive that stabilize a nasogastric tube to the nose of a patient, while the unclipped condition facilitates a caregiver's access to and assessment of the patient. With the nasogastric tube stabilization clip removably interconnecting a first portion and a second portion of the nasogastric tube stabilization adhesive, a caregiver can safely and comfortably assess the patient's skin in the unclipped condition, and if needed replace a portion of the nasogastric tube while it is not connected to the patient's nose. This is important because a patient's skin should be assessed every twelve hours.

In certain embodiments, the first portion of the nasogastric stabilization adhesive removably interconnects the nose of the patient to a first portion of the nasogastric tube stabilization clip, while the second portion removably interconnects the nasogastric tube stabilization clip to a second portion of the nasogastric tube. The first and second portions of nasogastric tube stabilization clip can removably interconnect to each other, thereby the first and second portions of the nasogastric stabilization adhesive can selectively and repeatedly disconnect and reconnect. As a result, the nasogastric tube stabilization clip enables the caregiver to easily unclip the first and second portions of the adhesive to assess the skin or replace only the first portion attached to the nose of the patient, which should be replaced every three days, when it becomes soiled, or loosens.

When the patient, the nasogastric tube, or the stabilization adhesive is not being tended to, the nasogastric tube stabilization clip can stabilize the nasogastric tube in the clipped condition.

SUMMARY OF THE INVENTION

In one aspect of the present invention, a nasogastric tube stabilization system includes a clip separable into a first portion and a second portion; and a nasogastric tube stabilization adhesive attached to each said portion.

In another aspect of the present invention, the nasogastric tube stabilization system includes the following: a clip separable into a first portion and a second portion, wherein the clip is moveable between a clipped condition and an unclipped condition in such way that the first portion is independently movably relative to the second portion; each said portion has a connection end providing an aperture; a nasogastric tube stabilization adhesive removably connected to each said portion, wherein each nasogastric tube stabilization adhesive extends between an elongated end and an epiphysis-shaped end, wherein each elongated end has a removable fastener dimensioned to operatively associate with the connection end; an adhesive provided along the epiphysis-shaped end; and a releasable liner coextensive with each adhesive.

These and other features, aspects and advantages of the present invention will become better understood with reference to the following drawings, description and claims.

DETAILED DESCRIPTION OF THE INVENTION

Figure 1:
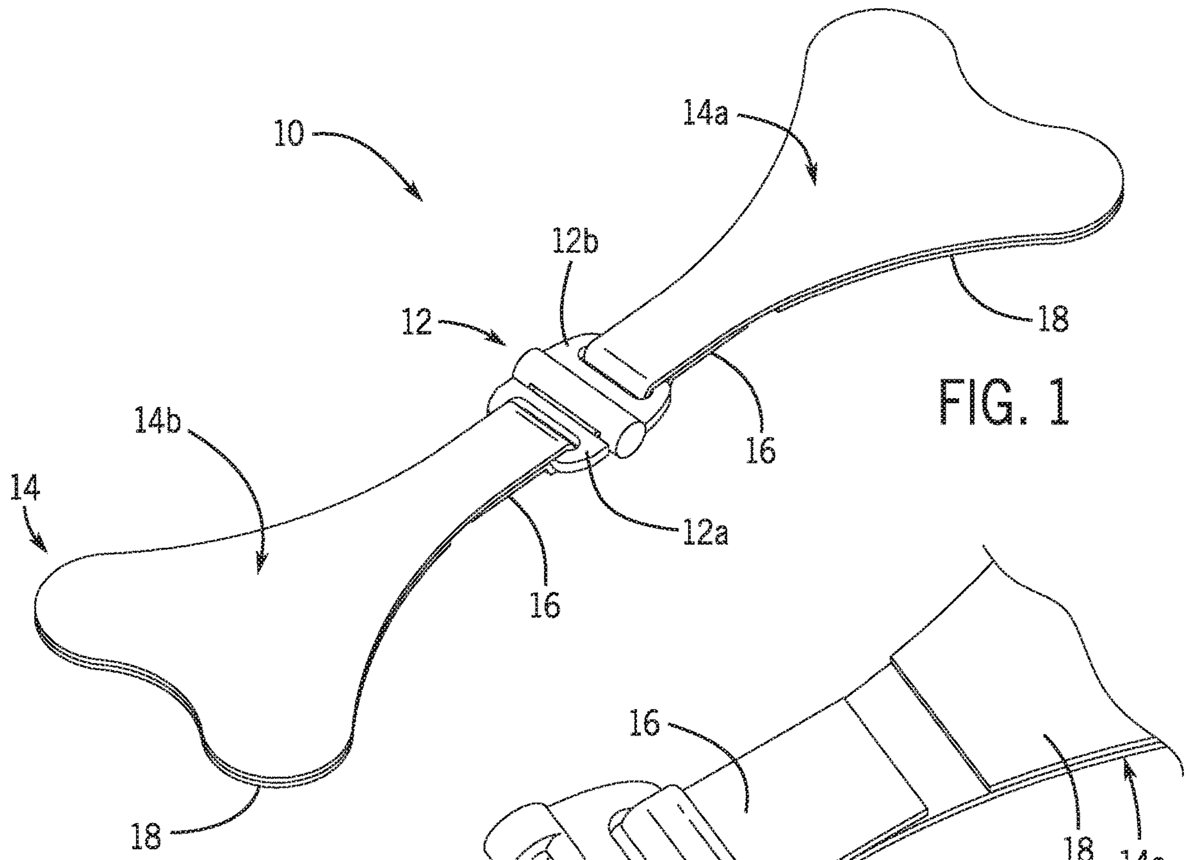
FIG. 1 is a top perspective view of an exemplary embodiment of the present invention.
Figure 2:
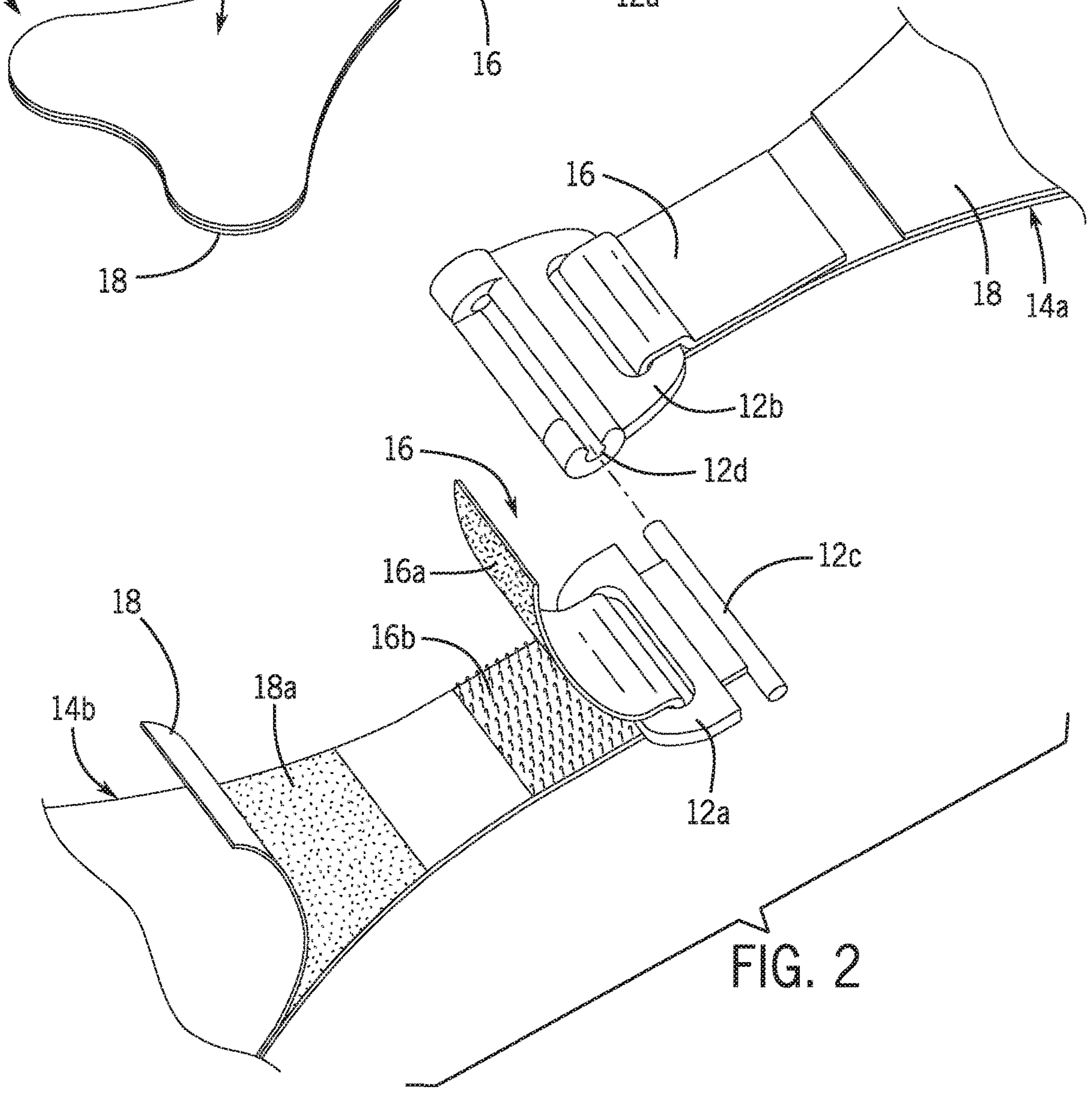
FIG. 2 is an exploded bottom perspective view of an exemplary embodiment of the present invention.
Figure 3:
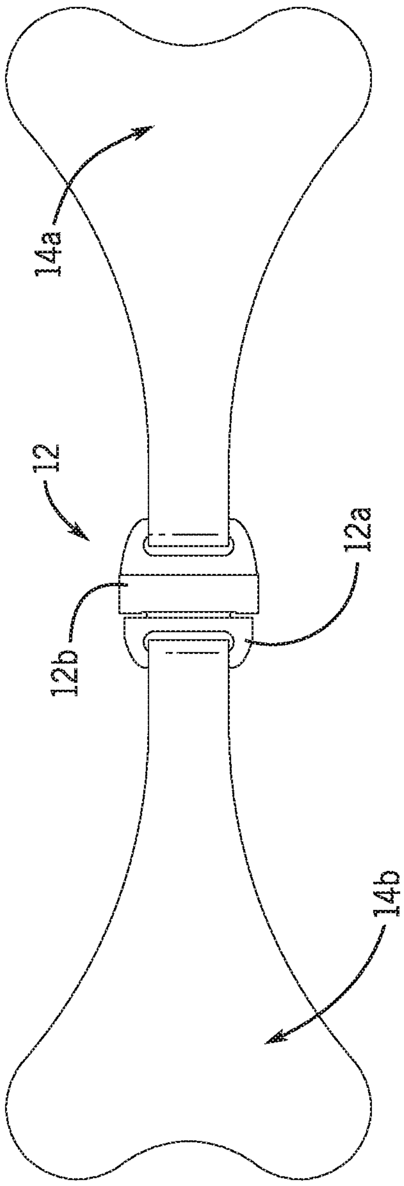
FIG. 3 is a top plan view of an exemplary embodiment of the present invention.
Figure 4:
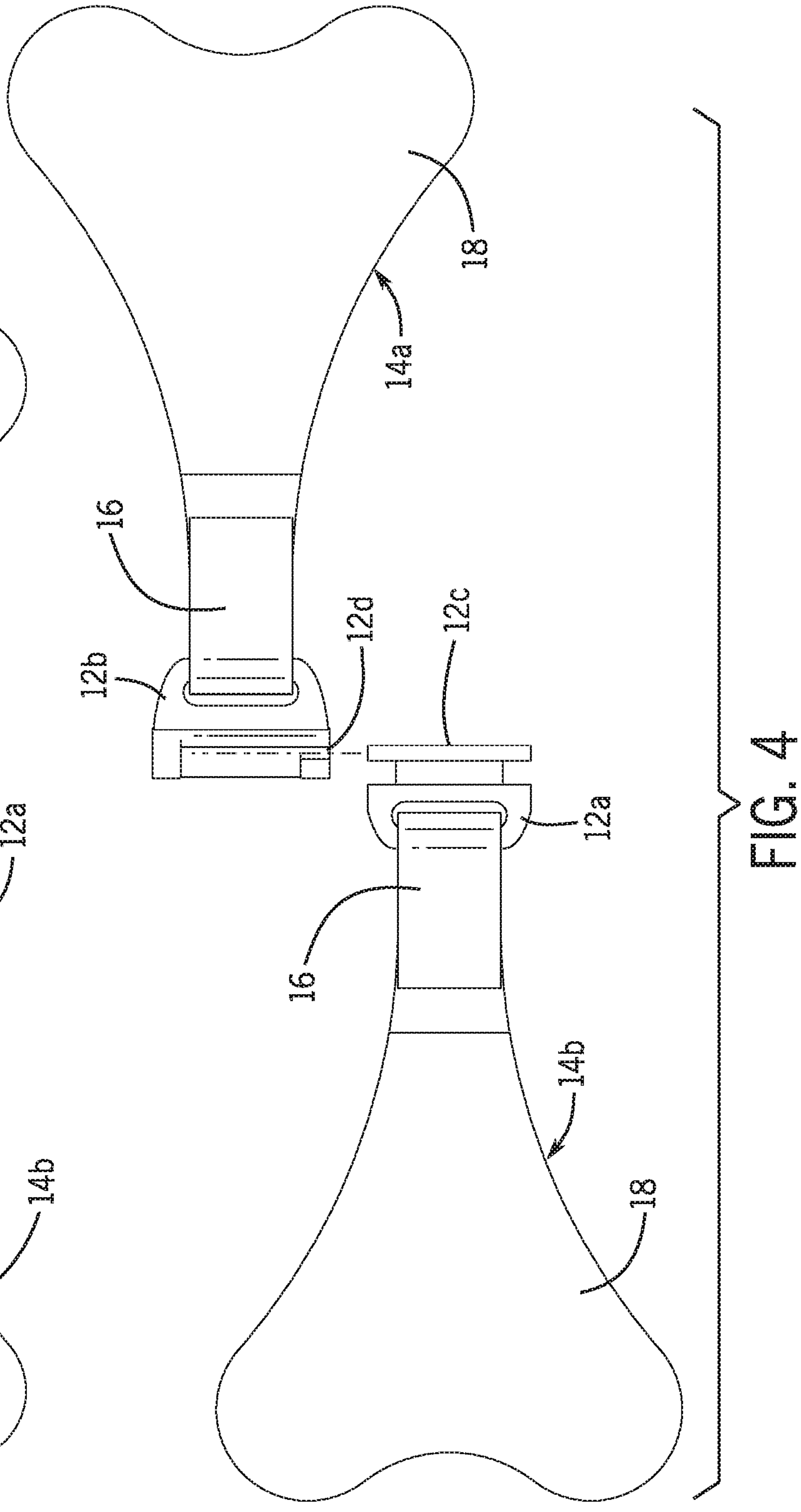
FIG. 4 is an exploded bottom plan view of an exemplary embodiment of the present invention.
Figure 5:
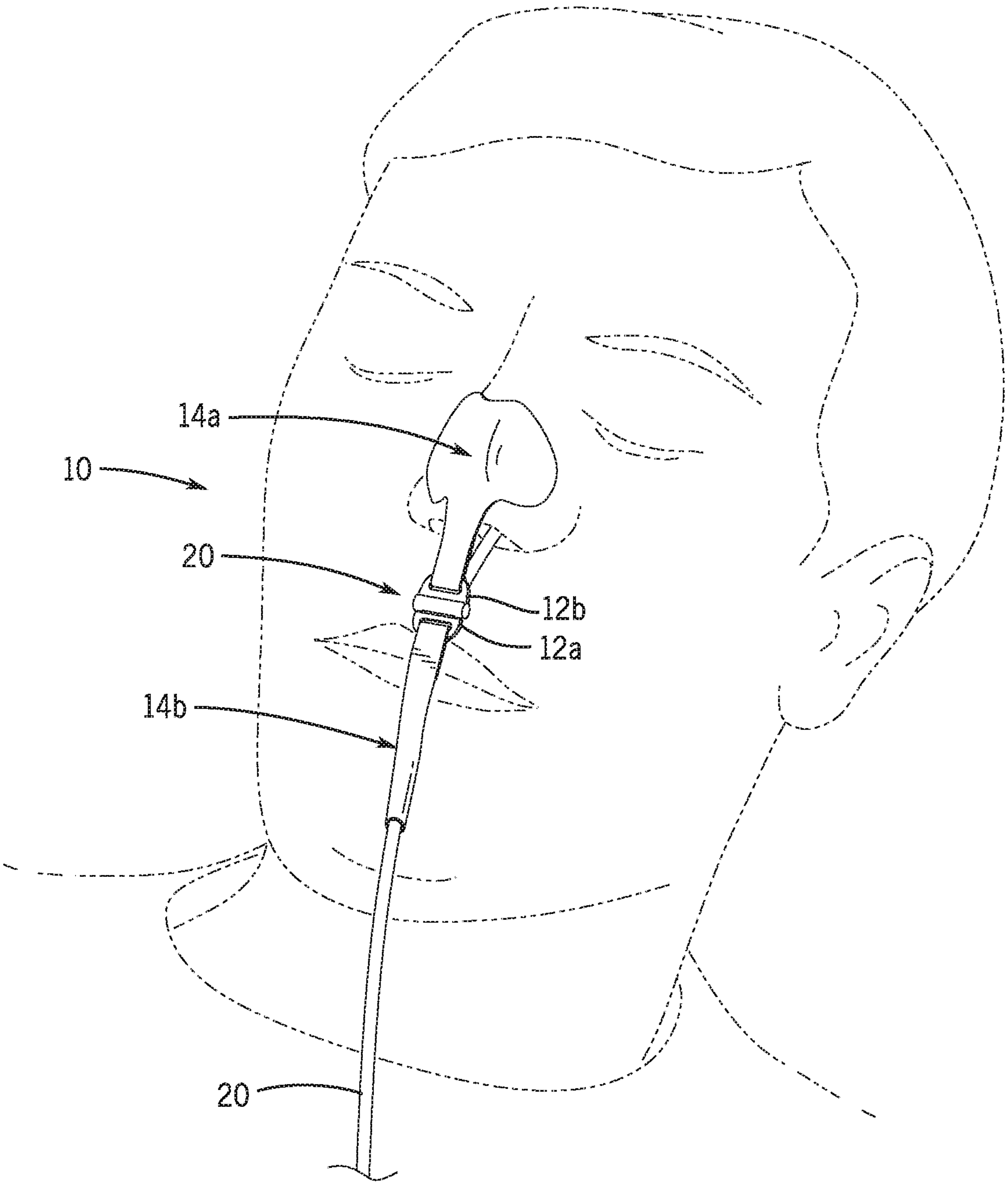
FIG. 5 is a perspective view of an exemplary embodiment of the present invention, shown in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Referring now to FIGS. 1 through 6, the present invention may include a nasogastric tube stabilization system 10 embodying a nasogastric tube stabilization clip 12 movable between a clipped condition and an unclipped condition, wherein the clipped condition interconnects two separate pieces 14*a* and 14*b* of nasogastric tube stabilization adhesive 14 that stabilizes a nasogastric tube 20 to the nose of a patient, while the unclipped condition facilitates a caregiver's access to and assessment of the patient by enabling the disconnected pieces 14*a* and 14*b* of nasogastric tube stabilization adhesive 14 to be moved independent of each other.

The nasogastric tube stabilization clip 12 may have a male portion 12*c* and a female portion 12*d* dimensioned and adapted to operatively associate in the clipped condition and operatively disassociate in the unclipped condition. Each male and female portion 12*c* and 12*d* provides a connection end 12*a* and 12*b*, respectively.

The nasogastric tube stabilization adhesive 14 includes a first portion 14*a* and second portion 14*b*, each formed from a material extending between a removable connection end 16 and an adhesive end. The removable connection end 16 may include an elongate portion of the material, the removable connection end 16 having a proximal connector 16*a* adjacent to a distal connector 16*b*, wherein the proximal connector 16*a* and the distal connector 16*b* are dimensioned and adapted to removable mate. The removable connection end 16 is dimensioned and adapted to engage the connection end 12*a* or 12*b*; in certain embodiments, by passing through an aperture provided by the respective connection end. In some embodiments, the removable connection end 16 is a hook and loop connection, and the proximal and distal connectors 16*a*, 16*b* are loop and hook portions thereof.

The adhesive end of each portion of the nasogastric tube stabilization adhesive 14 has an adhesive 18*a* (possibly a layer or coating) along one surface the material thereof. The adhesive 18*a* may be covered by a generally coextensive releasable layer 18. The adhesive end may have a wing-shape or epiphysis shape, as illustrated in the FIGS., compared to the elongated strap-like shape of its opposing removable connection end 16.

Figure 6:
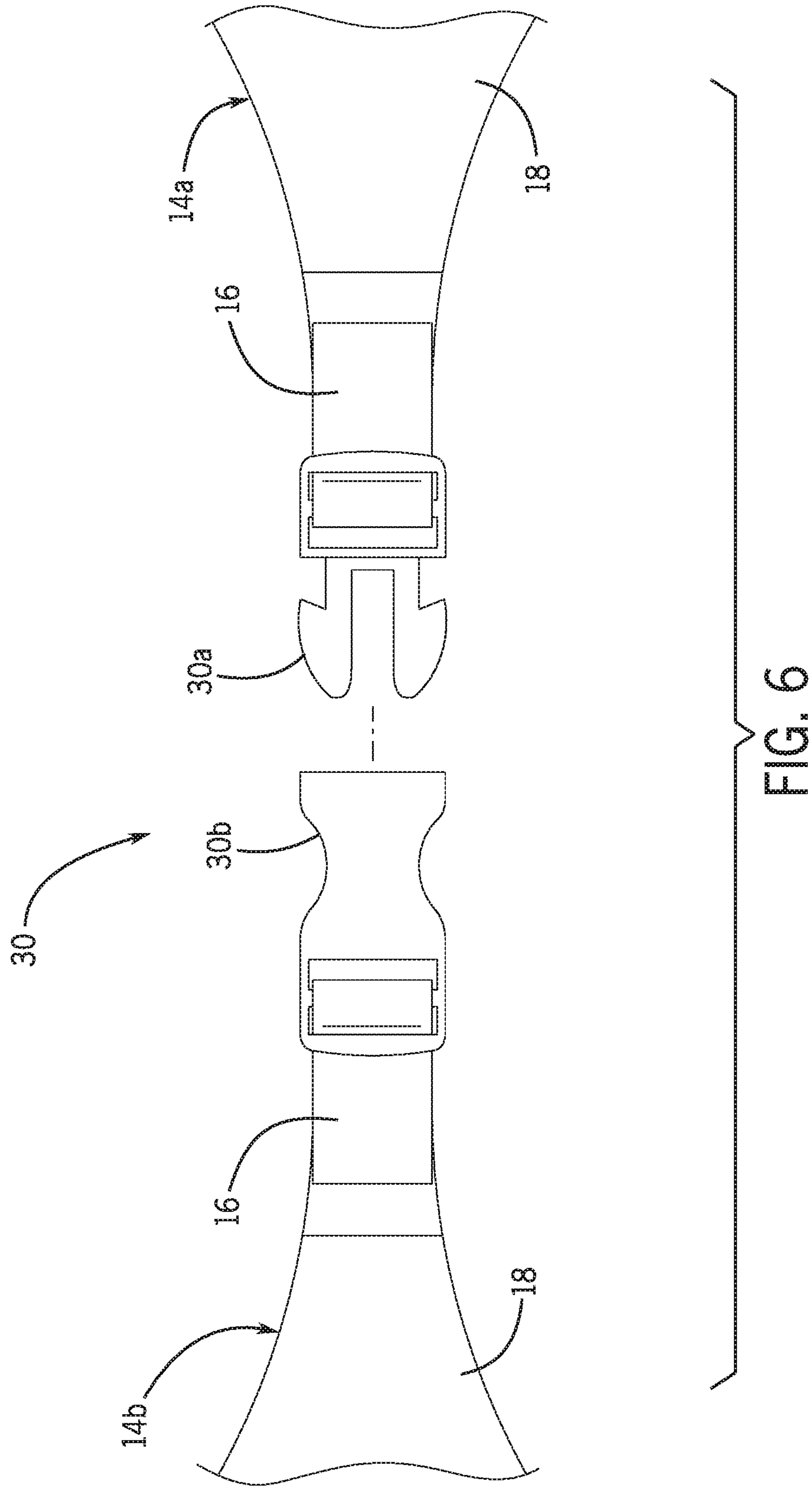
FIG. 6 is an exploded top plan view of an exemplary embodiment of the present invention.

It should be understood that the core conceptive is the nasogastric tube stabilization clip 12 operatively associated between the first portion 14*a* and the second portion 14*b* of nasogastric tube stabilization adhesive 14, wherein the nasogastric tube stabilization clip 12 is movable between a clipped condition and an unclipped condition. Thus, the nasogastric tube stabilization clip 12 may be any device that can removably connect a first object to a second object. For instance, the nasogastric tube stabilization clip 12 may be embodied in a quick release clip 30 having a male portion 30*a* and a female portion 30*b*, as illustrated in FIG. 6. In any event, the device is detachable into first and second portions that may be reattached. Meanwhile, the first portion removably connects to the first object of the device and the second portion of the device removably connects to the second object, wherein the first and second objects are nasogastric tube stabilization adhesives.

A method of using the present invention may include the following. The nasogastric tube stabilization system 10 disclosed above may be provided. A user can adhere the second portion 14*b* of the nasogastric tube stabilization adhesive 14, by way of its adhesive 18*a*, to a nasogastric tube 20, and likewise adhere the first portion 14*a* to the nose of the patient utilizing the nasogastric tube 20. When the nasogastric tube stabilization clip 12 is in the clipped condition, the nasogastric tube 20 is secured and stabilized on the patient. When the user wants to assess the patient's nasal areas and/or manipulate the nasogastric equipment, the user need only move the nasogastric tube stabilization clip 12 to the unclipped condition to do so. Accordingly, the present invention has the following advantages: reduces the likelihood of accidental dislodgment during medical attention and related medical device replacement; reduces the amount of discomfort caused to the patient; and reduces the occurrence of pressure ulcer development within the nare.

The present invention may be packaged separately as first and second pieces or packaged as a set in a nasogastric tube kit for use upon insertion.

It should be understood, of course, that the foregoing relates to exemplary embodiments of the invention and that modifications may be made without departing from the spirit and scope of the invention as set forth in the following claims.

What is claimed is:

1. A nasogastric tube stabilization system comprising:

a clip separable into a first clip portion and a second clip portion when the clip moves between a clipped condition and an unclipped condition, wherein each said clip portion has a connection end and a mating end;

a first adhesive piece removably attached to the first clip portion;

a second adhesive piece removably attached to the second clip portion, wherein each adhesive piece includes an elongated end and an adhesive end opposite the elongated end;

wherein each elongated end comprises a proximal connector and a distal connector movable between an unattached condition and an attached condition, wherein the attached condition operatively associates the elongated end with the connection end of the first or second clip portion such that the proximal connector and the distal connector define a removable attachment between the elongated end and said connection end of the first or second clip portion;

each adhesive end having an adhesive configured to attach to either a nose of a patient or a nasogastric tube; and where, in the clipped condition, the mating ends of the first clip portion and the second clip portion are disposed between the adhesive ends and the elongated ends, and whereby in the unclipped condition, the first and second adhesive pieces are physically separable to facilitate an assessment of an area of said nose.

2. The nasogastric tube stabilization system of claim 1, wherein the first clip portion and the second clip portion are movable independent of each other in the unclipped condition.

3. The nasogastric tube stabilization system of claim 2, wherein each adhesive end has an epiphysis shape.

4. The nasogastric tube stabilization system of claim 3, wherein the first and second adhesive pieces are substantially identical.

5. The nasogastric tube stabilization system of claim 4, further comprising a releasable liner coextensive with each adhesive end.

6. The nasogastric tube stabilization system of claim 1, wherein each connection end provides an aperture for receiving the elongated end for forming the attached condition.

7. A nasogastric tube stabilization system comprising:

a clip separable into a first clip portion and a second clip portion so that the clip is moveable between a clipped condition and an unclipped condition;

wherein each said clip portion has a connection end;

an adhesive piece removably connected to each said clip portion, wherein each adhesive piece has a first surface that extends along an elongated end and an epiphysis-shaped end of the adhesive piece, wherein each elongated end has a removable fastener provided directly on the first surface to removably connect, by folding back onto itself, with the connection end of the clip portion;

an adhesive provided directly on the first surface of the epiphysis-shaped end of each adhesive piece, wherein said adhesives are adapted to adhere to a nose of a patient or a nasogastric tube;

wherein each clip portion has a mating element, wherein a first mating element of the first clip portion comprises a first cylindrical body defining a clip slot, and wherein a second mating element of the second clip portion defines a second cylindrical body dimensioned and shaped to laterally slide into and nest in the clip slot so as to define the clipped condition; and where, in the clipped condition, the first clip portion and the second clip portion disposed between the elongated ends and the epiphysis-shaped ends, whereby, in the unclipped condition, when said adhesives are attached to said nose and said nasogastric tube, the adhesive pieces are physically separable to facilitate an assessment of an area of said nose.

* * * * *